United States Patent [19]

Payne

[11] 4,078,642
[45] * Mar. 14, 1978

[54] SANITARY ROLLER CONVEYOR

[75] Inventor: Ralph Payne, Irving, Tex.

[73] Assignee: F.E.I., Inc., Dallas, Tex.

[*] Notice: The portion of the term of this patent subsequent to Jan. 13, 1993, has been disclaimed.

[21] Appl. No.: 625,547

[22] Filed: Oct. 24, 1975

Related U.S. Application Data

[63] Continuation-in-part of Ser. No. 457,859, Apr. 4, 1974, Pat. No. 3,931,878.

[51] Int. Cl.² .............................................. B65G 39/09
[52] U.S. Cl. .................................................... 193/37
[58] Field of Search ................ 193/35 R, 37; 308/18, 308/20, DIG. 7, DIG. 8, DIG. 9; 198/127 R, 192 R, 192 A, 780, 842; 29/110, 116 R, 116 AD

[56] References Cited

U.S. PATENT DOCUMENTS

| | | | |
|---|---|---|---|
| 1,211,154 | 1/1917 | Hoeffleur | 308/20 |
| 1,425,561 | 8/1922 | Wego | 308/20 |
| 1,499,920 | 7/1924 | Godden | 193/37 |
| 1,893,574 | 1/1933 | Anderson | 308/20 |
| 2,607,459 | 8/1952 | Ludwig et al. | 193/37 |
| 2,687,799 | 8/1954 | Saxe | 308/20 X |
| 2,711,299 | 6/1955 | Dugle | 308/20 X |
| 3,181,688 | 5/1965 | Schermer | 198/127 R |
| 3,353,644 | 11/1967 | McNash et al. | 193/37 |
| 3,648,824 | 3/1972 | Speck | 198/192 R |
| 3,899,063 | 8/1975 | Pollard | 193/37 X |
| 3,931,878 | 1/1976 | Payne | 193/37 |

FOREIGN PATENT DOCUMENTS

| | | | |
|---|---|---|---|
| 242,776 | 1/1963 | Australia | 193/37 |
| 574,606 | 3/1958 | Italy | 198/192 R |
| 220,122 | 8/1924 | United Kingdom | 193/37 |
| 699,295 | 11/1953 | United Kingdom | 193/37 |
| 985,792 | 3/1965 | United Kingdom | 193/37 |

Primary Examiner—Robert W. Saifer
Assistant Examiner—James L. Rowland
Attorney, Agent, or Firm—Richards, Harris & Medlock

[57] ABSTRACT

The specification discloses a roller conveyor having a plurality of elongated cylinders arranged to define a planar conveyor path. Each of the cylinders includes a low friction plastic bearing member rigidly mounted in each end thereof, with each of the bearing members including blind sockets formed in the centers. The cylinders are disposed between a pair of parallel side rails and a plurality of rigid metal shafts are connected along the interior sides of the rails. The ends of the shafts are received within the blind sockets in the bearing members such that the bearing members and cylinders rotate relative to the rigid metal shafts.

1 Claim, 12 Drawing Figures

SANITARY ROLLER CONVEYOR

CROSS-REFERENCE

This application is a continuation-in-part of application Ser. No. 457,859, filed Apr. 4, 1974, now U.S. Pat. No. 3,931,878.

FIELD OF THE INVENTION

This invention relates to roller conveyors and more particularly to roller conveyors having bearings which may be operated and cleaned without accumulating undesired foreign substances within the conveyor rollers.

THE PRIOR ART

Previously developed roller conveyors generally include cylindrical rollers having bearings in the ends thereof, with an axle passing through the bearings and the roller for connection to side rails. The bearings generally comprise ball bearings or plastic inserts. When such prior roller conveyors are utilized in plants which require sanitary conditions, such as for example, food plants, pharmaceuticals and munitions manufacturers, and the like, problems have arisen when it is necessary to clean such roller conveyors. High pressure water and/or steam with detergents or other agents are generally utilized to clean the rollers. Due to the fact that the axle passes through the bearings of such prior roller conveyors, some of the liquid and cleaning material, as well as some of the undesirable foreign substances on the roller, is forced through the bearing into the cavity inside the roller. An accumulation of these materials often tends to build up inside the roller and breeds bacteria, odors, and other undesirable conditions, not the least of which includes rusting of the ball bearings or grinding away of non-ferrous bearings. Such undesirable foreign substances may also build up around those points where the axles are connected to the side rails. Moreover, it has often been somewhat difficult to remove the rollers of previously developed roller conveyors.

SUMMARY OF THE INVENTION

In accordance with the present invention, a roller conveyor is provided which generally eliminates or reduces the problem which characterizes the prior art. The present roller conveyor may be cleaned in place by the application of a high pressure stream of cleaning fluid solution, without the attendant possibilities of forcing some of the cleaning solution and/or foreign substances within the hollow roller. The present roller conveyor does not tend to rust or fail due to an accumulation of foreign matter within the roller as a result of cleaning of the conveyor, while it additionally reduces the accumulation of foreign substance around the area where the roller conveyor is supported on the side rail.

In accordance with another aspect of the invention a roller conveyor system for use in a sanitary environment includes a pair of spaced apart parallel side rails. A plurality of metal stub shafts have shaft portions with an annular flange formed thereon for abutting the interior wall of the side rail. Such shaft portions extend through apertures in said side rail to the exterior side of the rail and include means for securing the shaft portion to the exterior side of said rail. Hollow cylindrical rollers are disposed between the rails and low friction self-lubricating plastic bearing members are mounted on each end of the roller with blind right circular cylindrical sockets formed in the center of the outer ends of each of the bearing members. Generally spherical bearing portions are formed on the end of the stub shafts for insertion with the blind sockets. The bearing portions are dimensioned to closely engage a cylindrical section of the interior plastic walls of the blind sockets to rotatably suspend the bearing members and the hollow rollers carried thereby between the rails and to prevent the accumulation of foreign matter within the blind sockets. The shaft portion of the stub shaft may be alternately secured to the side rail by riveting the end of the shaft portion, crimping a lock ring fitted through slots formed on opposite sides of the shaft portion, using a set screw to engage the shaft portion in the side rail, or threading the shaft portion to engage an internally threaded aperture in the side rail. In addition, the blind right circular cylindrical socket may extend to a planar inner end surface, which surface tangentially engages the spherical bearing portion of the stub shaft to provide a point contact for rotation of the roller, particularly useful for an inclined roller.

In accordance with a more specific aspect of the present invention, a roller conveyor system includes a pair of spaced apart parallel side rails. A plurality of opposed metal stub shafts have generally spherical bearing portions integrally formed on the end of each of said stub shafts and extends through a shaft portion having an annular flange formed thereon for abutting the interior wall of said side rail, thereby opposing movement of the stub shaft toward the side rail. The shaft portion extends beyond the annular flange for insertion through an aperture in the side rail at spaced apart locations along the interior sides of the rails, the ends of the shaft portions extending through the apertures being riveted through the exterior side of the rail to prevent movement therebetween. Hollow cylindrical rollers are disposed between the rails and low friction self-lubricating plastic bearing members are rigidly mounted in the ends of the rollers. Blind sockets are formed in the center of the outer ends of each of the bearing members, and the bearing portions of the stub shaft are received within the blind sockets to rotatably suspend the hollow rollers between the rails.

In accordance with yet another aspect of this invention, a roller conveyor system includes a pair of spaced apart parallel rails. A plurality of opposed metal stub shafts have shaft portions extending through apertures in the rails at spaced apart locations along the interior sides of the rails and the end portions of the shaft portion extending through to the exterior side are riveted to the rail for securing the stub shafts to the rails. Hollow cylindrical rollers are disposed between the rails and low friction plastic bearing members are rigidly mounted in the ends of the hollow rollers. The bearing members include means for preventing foreign liquid and solid substances from entering the hollow cylindrical rollers. Blind right circular cylindrical sockets are formed in the center of the outer ends of each of the plastic bearing members and are spaced a predetermined distance apart. The blind sockets of each of said bearing members have inner end surfaces extending concavely from within. Generally spherical bearing portions are integrally formed on the end of the stub shaft for reception within the blind sockets. The bearing portions are dimensioned to bear directly against the interior plastic walls of the blind sockets to rotatably suspend the bearing members in the hollow rollers carried thereby between the rails while preventing the accumulation of debris within the blind sockets. The bearing portions have truncated inner end surfaces so that the end surfaces of each of the bearing portions in the end surface of its respective blind socket define a space therebetween.

DESCRIPTION OF THE DRAWINGS

For a more complete understanding of the present invention, and for further objects and advantages thereof, reference is now made to the following description taken in conjunction with the accompanying drawings, in which.

DESCRIPTION OF THE PREFERRED EMBODIMENT

Figure 1:
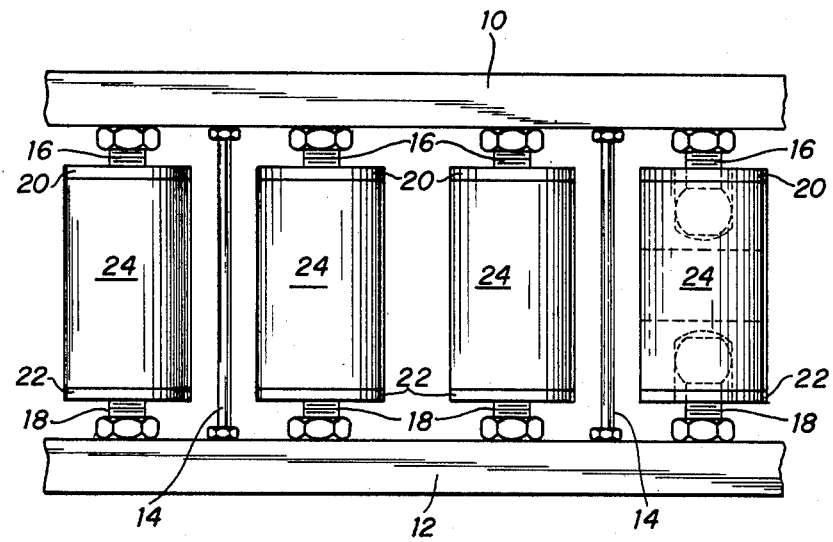
FIG. 1 is a top view of a portion of a roller conveyor constructed in accordance with the present invention.

Referring to FIG. 1, a pair of side rails 10 and 12 are spaced apart and are interconnected in a rigid configuration by stabilizing rods 14. Rails 10 and 12 and other metal parts of the conveyor system are preferably made from stainless steel, although a variety of other metals or plastics could be utilized. A plurality of pairs of rigid shafts 16 and 18 extend from the side rails 10 and 12. The ends of the shafts 16 and 18 are rounded and are received within blind sockets formed in the ends of plastic bearing members 20 and 22, in a manner which will be subsequently described. The bearing members 20 and 22 are force fitted into the open ends of cylindrical rollers 24. Rollers 24 may be constructed from metal such as stainless steel, or alternatively from other materials such as PVC, CPVC, polypropylene or other plastics.

Figure 2:
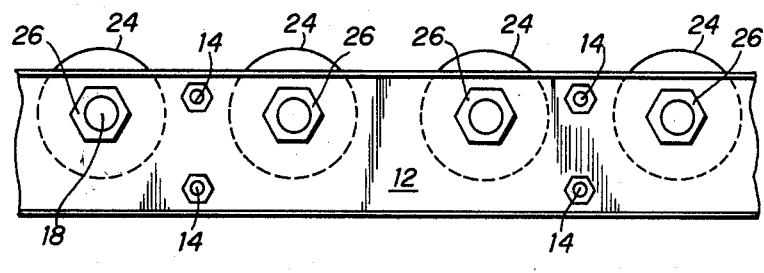
FIG. 2 is a side elevational view of a roller conveyor system shown in FIG. 1.

FIG. 2 illustrates a side view of the roller conveyor system shown in FIG. 1. The ends of the shafts 18 are attached to the side rail 12 by nuts 26. The shafts 18 are positioned in the upper portion of the side rail 12 such that the tops of the rollers 24 project above the side rail 12. Boxes and other apparatus may thus be rolled over the tops of the rollers 24 in the manner of a typical roller conveyor system.

An important aspect of the present invention is the fact that the rigid shafts 16 and 18 do not extend through the bearing members 20 and 22, thereby eliminating the possibility of fluid or foreign material from collecting inside the rollers 24. The present system may thus be washed with high pressure fluid without the fear of accumulating foreign material within the rollers.

Figure 3:
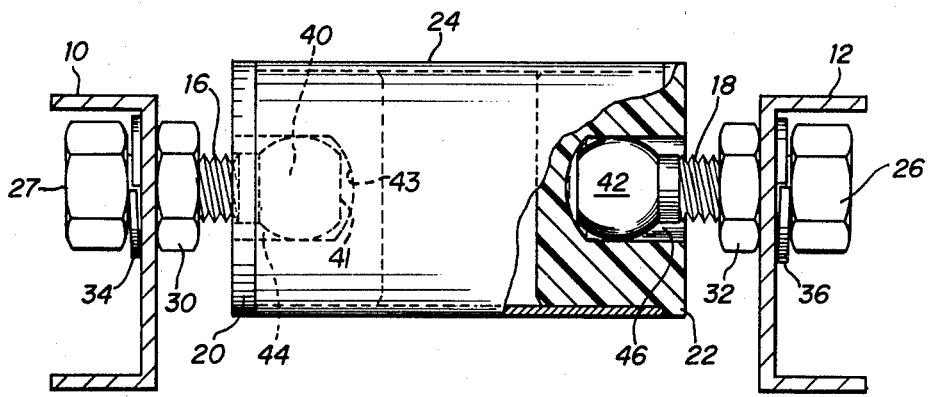
FIG. 3 is a side view, partially broken away, of one of the conveyor rollers shown in FIG. 1.

FIG. 3 illustrates in detail the preferred construction of one of the rollers 24. The side rails 10 and 12 have generally U-shaped cross-sections, with apertures spaced along the length thereof for receiving the ends of shafts 16 and 18. As is shown in FIG. 3, the length of the shafts 16 and 18 are threaded. The threaded ends of the shafts are disposed through apertures in the rails 10 and 12 and secured to the rails by interior nuts 30 and 32 and by exterior nuts 27 and 26. Lock washers 34 and 36 are disposed between the nuts 26 and 27 and the side rails. This connection of the shafts 16 and 18 in the side rails enables the shafts to be easily removed for cleaning or for roller replacement.

The ends of the shafts 16 and 18 comprise circular ball members 40 and 42. The ball member 40 extends within a blind socket 44 defined within the plastic bearing member 20. The ball member 42 extends within a blind socket 46 formed within the plastic bearing member 20. Bearing members 20 and 22 are preferably machined of self-lubricating plastic having a low coefficient of friction. A material suitable for use in forming the bearing members is a plastic manufactured and sold under the trademark "1900 UHMW" by Hercules Chemical, Inc. of Wilmington, Del. Such high impact plastics have an extremely low coefficient of friction with high hardness index. The plastics are highly resistant to most chemicals and have extremely high abrasion resistance. Of course, it should be realized that any one of a number of plastics within the plastic family called polyolefin which have the desired lubricity, impact and abrasive resistance qualities may be utilized with the present invention to form the bearing members.

Figure 4:
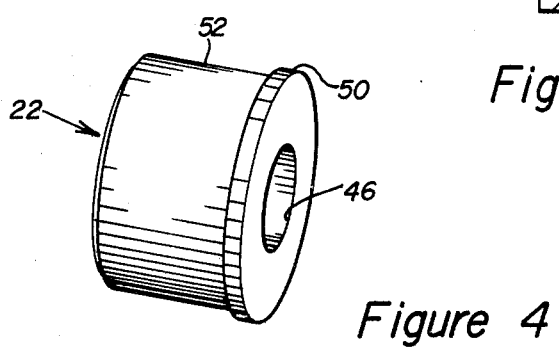
FIG. 4 is a perspective view of one of the bearing members of the invention.

A perspective view of the bearing member 22 is illustrated in FIG. 4 whereupon it will be seen that the bearing member includes an outer annular flange 50 which abuts with the end of the roller 24. The rear body of the bearing member 22 includes a cylindrical member dimensioned to fit tightly within the interior diameter of the roller 24. Thus, it is not possible for fluid or other material to be forced between the periphery of the bearing member 22 and the interior diameter of the roller 24. The blind socket 46 is dimensioned to closely receive the ball member 42. Due to the fact that the blind socket 46 does not extend through the bearing member 22, no path is provided for liquid or debris to pass through the bearing member 22 to the interior of the roller 24.

FIGS. 5 through 12 illustrate alternate embodiments of the roller conveyor system shown in FIG. 1. Prime numbers are used in these figures to indicate elements of the alternate embodiment that correspond to previously numbered elements appearing in FIG. 1.

Figure 5:
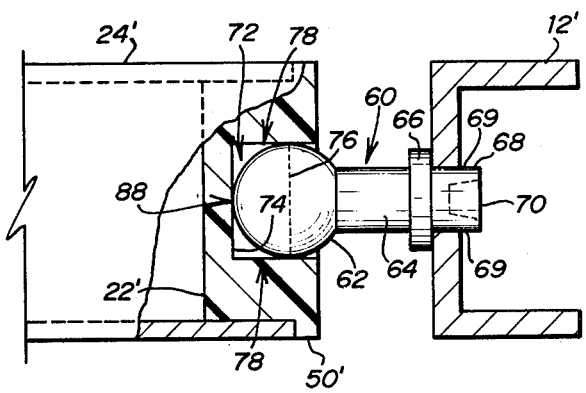
FIG. 5 is a side view, partially broken away, of a preferred embodiment of one of the conveyor rollers of the present invention.

FIG. 5 illustrates in detail the construction of one of the rollers 24'. The side rail 12' has a generally U-shaped cross-section with apertures spaced along the entire length thereof for receiving the ends of the rigid metal stub shafts 60.

The stub shaft 60 includes an integrally formed spherical bearing portion 62 extending to a shaft portion 64 having an integrally formed annular flange 66 for determining the distance the stub shaft 60 extends from side rail 12' and for preventing further inward movement of the stub shaft through aperture 68 in side rail 12'. Shaft portion 64 extends beyond the annular flange 66 to an end 70 having flanges 69 for riveting the stub shaft 60 to the side rail 12'.

The riveted end 70 of the stub shaft 60 is shown more clearly below in FIG. 6. By riveting the stub shaft 60 to the side rail 12' the stub shaft 60 is fixed with respect to the side rail 12'. Moreover, the riveted stub shaft 60 reduces the accumulation of foreign substances around the area where the stub shaft 60 is supported on side rail 12'.

The spherical bearing portion 62 of the stub shaft 60 in FIG. 5 extends within a blind socket 72 of the plastic bearing member 22'. The blind socket 72 of the bearing member 22' is a right circular cylinder extending to a planar inner end surface 74. The spherical bearing portion 62 is closely received within the blind socket 72 to prevent the accumulation of foreign matter within the blind socket 72. The spherical bearing portion 62 has a cylindrical section 76 engaging the interior plastic walls 78 of the bearing member 22'. Further, the bearing portion 62 may extend inwardly to tangentially engage planar end surface 74 at a point 80. The seating depth of bearing portion 62 within blind socket 72 may be regulated by the length of stabilizing rod 14 used to join rails 10 and 12 (FIG. 1). The inward thrust of the bearing portion 62 at a point contact 80 stabilizes the roller 24' and offers minimal frictional resistance.

Figure 6:
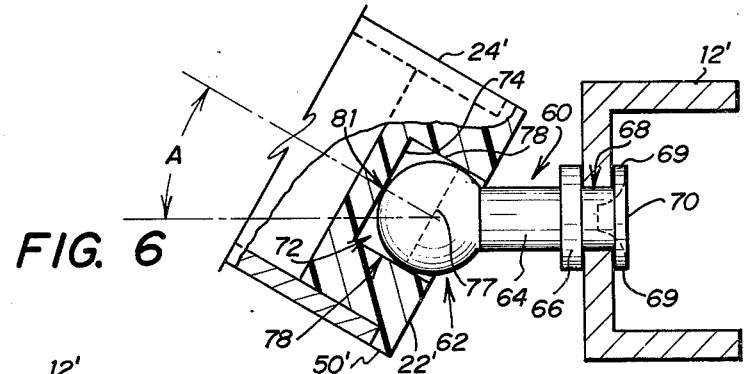
FIG. 6 is a side view, partially broken away, of an inclined roller of the roller conveyor system of the present invention.

FIG. 6 illustrates the roller conveyor shown in FIG. 5 where the roller 24' has an inclined axis of rotation with respect to the side rail 12'. The inclined roller 24' is rotatably supported by a cylindrical section 77 of the generally spherical bearing portion 62 of stub shaft 60 engaging a corresponding cylindrical section of the interior plastic wall 78 of the bearing member 22'. The bearing member 22' is additionally rotatably supported by a point contact 81 created by planar end surface 74 tangentially engaging spherical bearing portion 62. The point contact 81 for the inclined roller 24' is determined by the inclined axis of rotation of roller 24'. As the angle of inclination A increases, the point of tangential contact will advance around the upper portion of the bearing portion 62 to the point contact 81. Minimal rolling frictional resistance is offered at the point contact 81 because it is a tangential engagement between a plane, end surface 74, and a sphere, bearing portion 62. This type of contact has numerous advantages over prior art roller conveyors having a sharp conical point bearing engaging either a planar end surface or closely received within a similar conical bearing member. One of the advantages is the reduced wear of parts occurring at the tangential point of contact 81 in load bearing inclined rollers 24' shown in FIG. 6. (The same advantage of reducing wear on the parts exists for roller 24' of FIG. 5).

Figure 7:
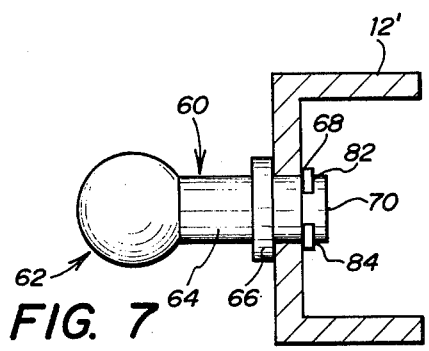
FIG. 7 is a side view of an alternate embodiment of the stub shaft of the present invention.
Figure 8:
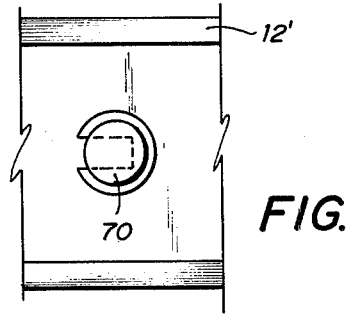
FIG. 8 is an end view of the stub shaft of FIG. 7.

Referring to FIGS. 7 and 8, there is illustrated an alternate embodiment of the stub shaft 60. The stub shaft 60 is prevented from movement toward the side rail 12' by the annular flange 66 formed on the shaft portion 64 of the stub shaft 60. The shaft portion 64 extending through the opening 68 of the side rail 12' extends to an end 70 having slots 82 and 84 machined on opposite sides of the end 70. A lock ring 86 is fitted through the slots 82 and 84 and crimped to securely attach the stub shaft 60 to the side rail 12'.

Figure 9:
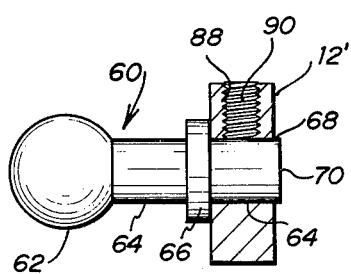
FIG. 9 is a side view of an alternate embodiment of the stub shaft of the present invention.

FIG. 9 illustrates another alternate embodiment of the stub shaft 60. The annular flange 66 abuts the interior wall of the side rail 12' and the shaft portion 64 of the stub shaft 60 extends on through the opening 68 of the side rail 12' extending to the end 70. A threaded slot 88 extends perpendicularly through the top of the side rail 12' to the opening 68. A set screw 90 is received within the threaded opening 88 for engaging the shaft portion 64 of the stub shaft 60 within the opening 68 of the side rail 12'. The set screw 90 engages shaft portion 64 to prevent rotation of the stub shaft 60 with respect to the side rail 12'. Stub shaft 60 may be quickly and easily inserted or removed by use of the set screw 90.

Figure 10:
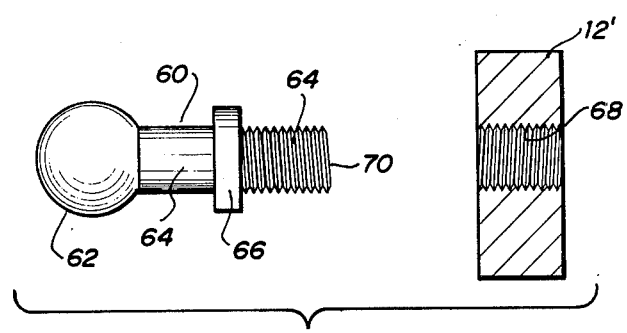
FIG. 10 is an exploded side view of an alternate embodiment of the stub shaft of the present invention.

FIG. 10 illustrates yet another alternate embodiment of the stub shaft 60 received in a side rail 12'. In this embodiment the aperture 68 formed in side rail 12' is threaded for receiving a correspondingly threaded shaft portion 64 of the stub shaft 60 extending beyond annular flange 66.

Figure 11:
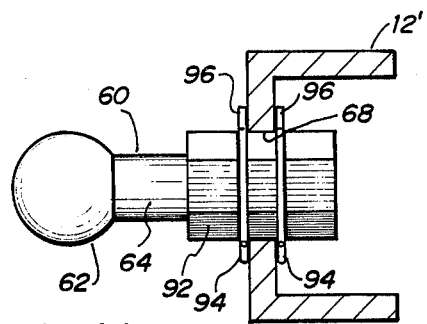
FIG. 11 is a side view of an alternate embodiment of the stub shaft of the present invention.
Figure 12:
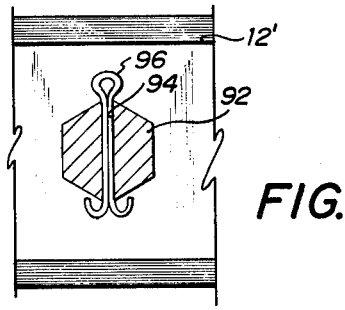
FIG. 12 is an end view of the stub shaft as seen in FIG. 11.

Referring to FIGS. 11 and 12, there is shown yet another embodiment of the stub shaft 60. Here, the shaft portion 64 of the stub shaft 60 extends to a shaft portion 92 having a hexagonal cross-section. The opening 68 formed in the side rail 12' is dimensioned to closely receive the hexagonal cross-section of the shaft portion 92. The shaft portion 92 has openings 94 extending completely through the shaft portion 92 closely adjacent the interior and exterior walls of the side rail 12'. A pair of cotter pins 96 are inserted through openings 94 to securely attach the stub shaft 60 to the side rail 12'. The hexagonal cross-section of the shaft portion 92 prevents rotation of the stub shaft 60 with respect to the side rail 12', while the cotter pins 96 prevent lateral movement of the stub shaft in the side rail 12'. With this embodiment the stub shaft 60 may be quickly removed by removing the cotter pins 96.

It will thus be seen that the sanitary roller conveyor of the present invention eliminates foreign matter from entering within the hollow cylindrical rollers. The roller conveyor is ideally suited for use in sanitary conditions, because the entire conveyor may be constructed from stainless steel and a self-lubricating, low friction plastic material, thereby eliminating rusting or premature deterioration of the roller conveyor. The high impact plastic bearing members have the desired qualities of lubricity along with resistance to abrasion and corrosive chemicals. The self-lubricating rollers of the present invention eliminate the sometimes labyrinthine lubricant packing and sealing arrangements found in some conveyors that frequently become sites for the accumulation of debris.

The bearing portion of the metal stub shaft is closely received within the blind socket of the bearing member to both prevent foreign material from entering the hollow roller at this point and to allow a pressurized cleaning solution to pass around the end of the shafts in the blind sockets to wash out anything collected therein during the operation of the rollers. The sanitary rollers of the present invention may be cleaned and placed on a food line or the like where a high pressure hose may be used frequently to apply a pressurized cleaning solution to the ends of the rollers. The metal stub shafts, which may be constructed of stainless steel, and the high impact plastic bearing members provide a long wearing practically maintenance-free roller conveyor system. Moreover, the combination of the spherical bearing in the blind socket with a planar end surface enables the roller conveyor to be used while the roller is inclined without increasing the frictional resistance to rotation.

Although a preferred embodiment of the invention has been described in detail, it is to be understood that various changes, substitutions, and alterations can be made therein without departing from the sphere and scope of the invention as defined by the appended claims.

What is claimed is:

1. A roller conveyor system for use in a sanitary environment comprising:
   a pair of spaced apart parallel rails;
   a plurality of opposed metal stub shafts having shaft portions extending through apertures in said rails at spaced apart locations along the interior sides of said rails and having the end portions of said shaft portion riveted to the exterior side of said rail for securing said stub shafts to said rails;
   hollow cylindrical rollers disposed between said rails;
   low friction plastic bearing members rigidly mounted in the ends of said hollow rollers;
   said bearing members including means for preventing foreign liquid and solid substances from entering the hollow cylindrical rollers;
   blind right circular cylindrical sockets formed in the center of the outer ends of each of said low friction plastic bearing members and spaced a predetermined distance apart;
   said blind sockets of each of said bearing members having inner end surfaces extending concavely from within;
   generally spherical bearing portions integrally formed on the ends of said stub shafts for being received within said blind sockets, said bearing portions being dimensioned to bear directly against the interior plastic walls of said blind sockets of the low friction plastic bearing members to rotatably suspend said bearing members and the hollow rollers carried thereby between said rails while preventing the accumulation of the debris within said blind sockets; and
   said bearing portions having truncated inner end surfaces so that the end surface of each of the bearing portions and the end surface of its respective blind socket define a space therebetween.

* * * * *

UNITED STATES PATENT AND TRADEMARK OFFICE
CERTIFICATE OF CORRECTION

PATENT NO. : 4,078,642
DATED : March 14, 1978
INVENTOR(S) : Ralph Payne

It is certified that error appears in the above–identified patent and that said Letters Patent are hereby corrected as shown below:

Column 2, line 5, "with" should be --within--.

Signed and Sealed this

Twenty-ninth Day of January 1980

[SEAL]

Attest:

SIDNEY A. DIAMOND

*Attesting Officer*     *Commissioner of Patents and Trademarks*